United States Patent
Brodt et al.

(10) Patent No.: US 11,048,701 B2
(45) Date of Patent: *Jun. 29, 2021

(54) QUERY OPTIMIZATION IN HYBRID DBMS

(71) Applicant: International Business Machines Corporation, Armonk, NY (US)

(72) Inventors: Andreas Brodt, Gerlingen (DE); Oliver Draese, San Jose, CA (US); Ruiping Li, San Jose, CA (US); Daniel Martin, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 807 days.

This patent is subject to a terminal disclaimer.

(21) Appl. No.: 15/263,946

(22) Filed: Sep. 13, 2016

(65) Prior Publication Data

US 2018/0075085 A1   Mar. 15, 2018

(51) Int. Cl.
*G06F 16/00* (2019.01)
*G06F 16/2453* (2019.01)

(52) U.S. Cl.
CPC .............. *G06F 16/24542* (2019.01)

(58) Field of Classification Search
CPC ......... G06F 17/30377; G06F 17/30463; G06F 9/466; G06F 17/30008; G06F 17/30592; G06Q 10/10; G06Q 30/02
See application file for complete search history.

(56) References Cited

U.S. PATENT DOCUMENTS

| 7,797,286 B2 | 9/2010 | Sauermann |
| 7,991,763 B2 | 8/2011 | Bestgen et al. |
| 9,244,793 B1 | 1/2016 | Brown et al. |
| 9,262,767 B2 * | 2/2016 | Sercinoglu ............. G06Q 30/02 |
| 2008/0256025 A1 * | 10/2008 | Bestgen ................ G06F 16/903 |

(Continued)

FOREIGN PATENT DOCUMENTS

WO   WO-2015030767 A1 *   3/2015   ....... G06F 17/30545

OTHER PUBLICATIONS

WO 2015030767 A1_Chen et al_ Queries Involving Multiple Databases and Execution Engines_Mar. 2015 (Year: 2015).*

(Continued)

*Primary Examiner* — Ashish Thomas
*Assistant Examiner* — Suman Rajaputra
(74) *Attorney, Agent, or Firm* — Francis Lammes; Stephen J. Walder, Jr.; Richard A. Wilhelm

(57) ABSTRACT

A mechanism is provided for generating statistical information for query optimization in a data processing system. The mechanism comprises a first database engine maintaining a current first dataset currently being stored, a second database engine maintaining a second dataset. The second dataset is generated from previous first datasets or from the previous first datasets and current first dataset, the previous first datasets being datasets that were previously maintained by the first database engine. The first database engine receives a database query for accessing the first dataset, the database query involving one or more attributes of the first data set. The first database engine generates a query execution plan for the database query on the first dataset using collected statistical information on at least the second dataset. The first database engine processes the database query according to the query execution plan.

18 Claims, 3 Drawing Sheets

(56) References Cited

U.S. PATENT DOCUMENTS

| | | | |
|---|---|---|---|
| 2012/0072413 A1 | 3/2012 | Castellanos et al. | |
| 2014/0095443 A1* | 4/2014 | Draese | G06F 16/113 |
| | | | 707/661 |
| 2014/0156632 A1 | 6/2014 | Yu et al. | |
| 2015/0149405 A1* | 5/2015 | Pathak | G06F 16/2462 |
| | | | 707/609 |
| 2015/0324432 A1* | 11/2015 | Gangloor | G06F 17/30463 |
| | | | 707/718 |
| 2016/0292167 A1 | 10/2016 | Tran et al. | |
| 2016/0292226 A1* | 10/2016 | Konik | G06F 16/25 |

OTHER PUBLICATIONS

List of IBM Patents or Patent Applications Treated as Related, Dec. 12, 2017, 2 pages.

* cited by examiner

QUERY OPTIMIZATION IN HYBRID DBMS

BACKGROUND

The present invention relates to the field of digital computer systems, and more specifically, to a method for generating statistical information for query optimization.

Database Management Systems (DBMS) often have multiple different access path options to respond to a query request. Multiple configuration and data related factors play a role in finding an optimal access path. A simple example is an index-based access, vs. a scan of the underlying table to access the data. Both access mechanisms are possible to answer the same query but one access path might outperform the other one by orders of magnitude. To find the right access path, many DBMS use an optimizer that evaluates the different access paths by associating cost models with the execution plan. Costs are here defined by the cost of a single operation (e.g. reading a page from disk) and the required amount of this operation (i.e. how many pages need to be read from disk). To generate these cost models, the optimizer requires some understanding of the data to process.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising at least one processor and at least one memory coupled to the at least one processor, is provided for generating statistical information for query optimization in the data processing system. In the illustrative embodiment, the data processing system comprises a first database engine maintaining a current first dataset currently being stored and a second database engine maintaining a second dataset generated from previous first datasets or from the previous first datasets and the current first dataset. In the illustrative embodiment, the previous first datasets are datasets that were maintained previously to the current first dataset by the first database engine. The illustrative embodiment receives, at the first database engine, a database query for accessing the first dataset, the database query involving one or more attributes of the first data set. The illustrative embodiment generates, by the first database engine, a query execution plan for the database query on the first dataset using collected statistical information on at least the second dataset, the collected statistical information comprising information on one or more attributes of the first dataset. The illustrative embodiment processes, by the first database engine, the database query according to the query execution plan.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

In the following embodiments of the invention are explained in greater detail, by way of example only, making reference to the drawings in which.

DETAILED DESCRIPTION

Figure 1:
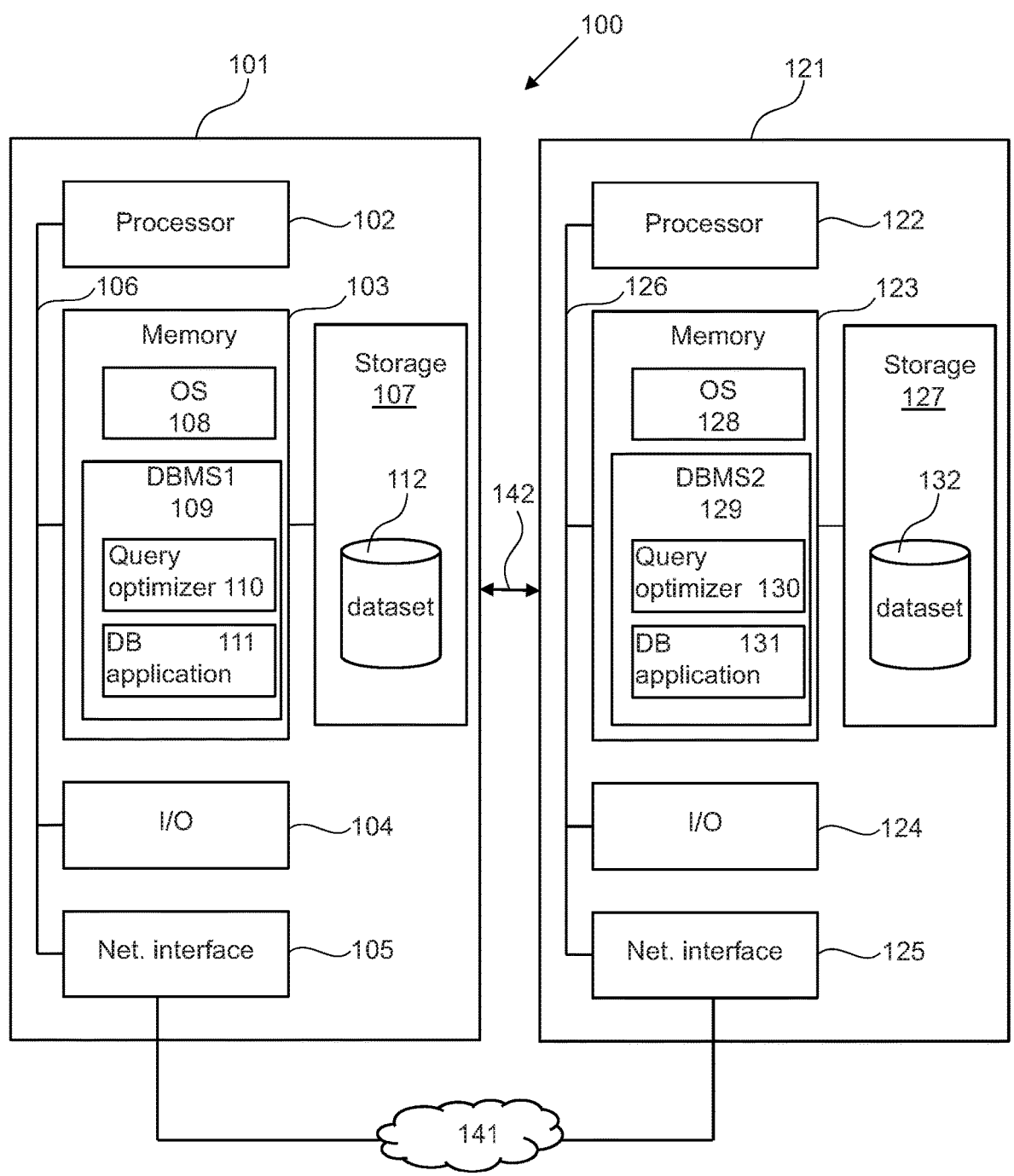
FIG. 1 is a block diagram depicting a data processing system for a hybrid DBMS in accordance within an illustrative embodiment.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In order to address a multitude of workload types with different requirements and goals, the data processing system is composed from more than one execution engine such that each of the execution or database engine may have a respective set of resources adapted to run on the datasets available at execution engine. For example, the first database engine may require less resources compared to the second database engine as the first dataset may be much smaller than the second dataset.

The present method may have the advantage of providing accurate statistics based on data that may not be present in the first database engine. This may increase the query performance in the data processing system.

The present method may have another advantage of overcoming the problem of expensive statistics generation for the first database engine (also referred to as transactional engine of a hybrid Database Management Systems (DBMS)). In order to approximate the characteristic of the data accurately (i. e. create a large histogram for frequency and cardinality, etc.), generating statistics requires reading large amounts of data which may not be available in the transactional engine. This is however the kind of workload which the transactional engine may not be tuned for. It requires lots of disk input/output (I/O), thrashes the buffer pool, and consumes lots of central processing unit (CPU) time. On the other hand, the second database engine (also referred to as analytics accelerator) may excel at this: its I/O architecture and data format may be optimized for scanning entire tables and for storing those entire tables. Also, the analytics accelerator may be provided with a lot more CPU power than the transactional engine. The analytics accelerator may also contain a query optimizer and thus requires statistics just like the transactional engine. It thus will compute the statistics anyway. The transactional engine can exploit this. Furthermore, the analytics accelerator can send new statistics to the transactional engine whenever new statistics have been computed. Finally, the analytics accelerator may also only collect a sample of the data so that the transactional engine can compute the statistics by itself.

According to one embodiment, the collecting of the statistical information comprises receiving by the first database engine from the second database engine the statistical information. This may have the advantage of saving processing resources in the first database engine. For example, generating statistics is a resource-intensive task. The tables have to be scanned and histograms need to be created for each column. Statistics might get outdated due to continuous data changes and need to be refreshed to reflect the current state of the data again. This requires significant CPU and memory and adds overhead to the database system that can impact production workloads. The I/O and CPU resources that are required to process the table are not available for normal operations. Database administrators therefore try to avoid generating or updating statistics whenever possible. Often, administrators even accept suboptimal access path during query execution time if they can save on the statistic generating costs. Some platforms also have a "pay per use" model, meaning that using the CPU by generating statistics directly results into higher charges. This embodiment may have the advantage of overcoming those problems.

According to one embodiment, the collection of the statistical information comprises: receiving by the first database engine from the second database engine a random sample on the second dataset; calculating by the first database engine statistical information on the random sample. This may have the advantage of reducing the resources needs for processing statistics at the first database engine and the optimizer may rely on its own generated statistics in order to optimize the database query. The first database engine save lots of disk I/O and it does not pollute its buffer pool by using the random sample provided by the second database engine; the statistical information determined by the first database engine based on the random sample works with the query optimization algorithms of the first database engine. For example, the second database engine may keep or store the sample as statistical information for further use in the second database engine (or the second database engine directly processing the sample, updating its own statistics in the system catalog, and then discarding the sample). This may make use of the already produced sample and no need to reprocess it again. Also processing the sample would consume less resources compared to processing the full dataset. In addition, when taking the samples from the second dataset a much better sample quality may be obtained a one look at the entire data, not only the latest rows (or partition).

According to one embodiment, the receiving of the random sample is performed in response to sending a request from the first database engine to the second database engine. This may save resources such as bandwidth and storage resources compared to the case where the sample is regularly received.

According to one embodiment, the receiving of the random sample is automatically performed on a predefined periodic basis. For example, the random sample may be sent every week or every day. In another example, the random sample may be sent every time the second dataset is refreshed. The random sample may for example be randomly selected from the second dataset e.g. as 10% or 1% of the second dataset. This may have the advantage of maintaining an up to date statistics and may thus further improve the query performance.

According to one embodiment, the first dataset comprises records of a given table having a commit date after a predefined date, the second dataset comprises records of the given table having a commit date before that predefined date.

According to one embodiment, the first dataset comprises records of a given table having an access frequency higher than a predefined access frequency threshold, the second dataset comprises records of the given table having an access frequency smaller than the predefined access frequency threshold.

According to one embodiment, the data processing system is a hybrid on-line transaction processing (OLTP) and on-line analytical processing (OLAP) database system, wherein the first database engine is configured for performing OLTP processes, wherein the second database engine is configured for performing OLAP processes.

These embodiments may seamlessly be integrated in existing data warehouse systems.

According to one embodiment, the method further comprises: receiving another database query for accessing the second dataset; generating by the second database engine a query execution plan for the other database query using the collected statistical information; processing the other database query in the second database engine according to the query execution plan. This may have the advantage of making use of previously generated statistics that have been sent to the first database engine. This may thus save processing resources that would otherwise be required for repeated statistics generation.

According to one embodiment, the statistical information comprising at least one of: the number of distinct values of the one or more attributes and the cardinality of values of the one or more attributes. Other examples of the statistical information may include the (100) most frequent values of a given attribute and/or histogram with number of attribute values in different ranges and/or correlation between attribute values of two or more attributes.

According to one embodiment, the method is performed regardless of the amount of resources that are available within the first database engine. This may have the advantage on relying on the data content and not on the available resources. For example, running on the second dataset may be advantageous compared to running on the first dataset although there are enough resources in the first database engine as the second dataset may comprise more information than the first dataset.

FIG. 1 is a block diagram depicting a data processing system 100 for a hybrid DBMS in accordance within an illustrative embodiment. The data processing system 100 comprises a first computer system 101 (also referred to as first database engine or transactional engine) connected to a second computer system 121 (also referred to as second database engine or accelerator engine). The first computer system 101 may for example comprise an IBM® System Z®. The second computer system 121 may for example comprise Netezza system.

First computer system 101 includes processor 102, memory 103, I/O circuitry 104 and network interface 105 coupled together by bus 106.

Processor 102 may represent one or more processors (e.g. microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 103 may include one or more separate programs e.g. database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein. DBMS1 109 comprises a DB application 111 and a query optimizer 110. The DB application 111 may be configured for processing data stored in storage device 107. For example, DB application 111 may be configured for generating statistical information from a first dataset 112 being stored in storage device 107. The statistical information from the first dataset 112 may be used by the query optimizer 110 for generating or defining query plans for executing queries e.g. on first dataset 112. The first dataset 112 may for example comprise transaction data that provides real time or near real time transaction data for OLTP analysis such as postings from a manufacturing control system.

Second computer system 121 includes processor 122, memory 123, I/O circuitry 124 and network interface 125 coupled together by bus 126.

Processor 122 may represent one or more processors (e.g. microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 104. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g. database management system DBMS2 129, each of which comprises an ordered listing of executable instructions for implementing logical functions, notably functions involved in embodiments of this invention. The software in memory 123 shall also typically include a suitable OS 128. The OS 128 essentially controls the execution of other computer programs for implementing at least part of methods as described herein. DBMS2 129 comprises a DB application 131 and a query optimizer 130. The DB application 131 may be configured for processing data stored in storage device 127. For example, DB application 131 may be configured for generating statistical information from a second dataset 132 being stored in storage device 127. The statistical information from second dataset 132 may be used by the query optimizer 130 for generating or defining query plans for executing queries e.g. on second dataset 132.

The first dataset 112 is the currently being used and stored dataset by the first computer system 101 any may for example be deleted from the first computer system 101 after a predefined time period, thus becoming previous first dataset. The second dataset 132 may be generated from a source dataset. The source dataset may comprise previous first datasets. In another example, the source dataset may comprise the previous first datasets and current first dataset 112. The previous first datasets are datasets that were previously stored (and are not anymore stored currently) in the first computer system 101 e.g. in a predefined previous time period.

The first and second datasets 112 and 132 may be stored in different format. The formats may differ in compression, row-oriented vs. column-oriented storage, etc.

For example, the second dataset 132 may be obtained by performing an Extract, Transform and Load (ETL) process on the source dataset. Data transformation may be accelerated using the second computer system 121 being for example a DB2 Analytic Accelerator. For example, data to be transformed does not necessarily have to be moved to another information integration server for transformation and cleansing purposes. These data can be transformed within the DB2 Analytics Accelerator.

In another example, the second dataset 132 may be obtained by replicating or copying the source dataset from the first computer system 101 to the second computer system 121. The second dataset 132 may comprise the attributes of the first dataset 112. For example, the second dataset 132 may comprise for a given attribute more attribute values than attribute values of the given attribute in the first dataset 112.

First computer system 101 and second computer system 121 may be independent computer hardware platforms communicating through a high-speed connection 142 or a network 141 via network interfaces 105, 125. The network 141 may for example comprise a local area network (LAN), a general wide area network (WAN), and/or a public network (e.g., the Internet). Every computer system 101 and 121 is responsible for managing its own copies of the data.

Although shown in FIG. 1 as separate systems, the first and second computer systems may belong to a single system e.g. sharing a same memory and processor hardware, while each of the first and second computer systems is associated with a respective DBMS and datasets e.g. the two DBMSs may be stored in the shared memory. In another example, the two database management system DBMS1 and DBMS2 may form part of a single DBMS that enables communications and method performed by DBMS1 and DBMS2 as described herein. The first and second datasets may be stored on a same storage or on separate storages.

The data processing system 100 may for example categorize every incoming query and execute it on the engine that meets these characteristics best. The first computer system 101 may be responsible for efficient lookup in transactional workloads (OLTP) and may be optimized for accessing limited amounts of data e.g. of the first dataset 112. The second computer system 121 may be responsible for data scans in the scope of analytical applications (OLAP), which require to read large amounts of data in a single query.

Figure 2:
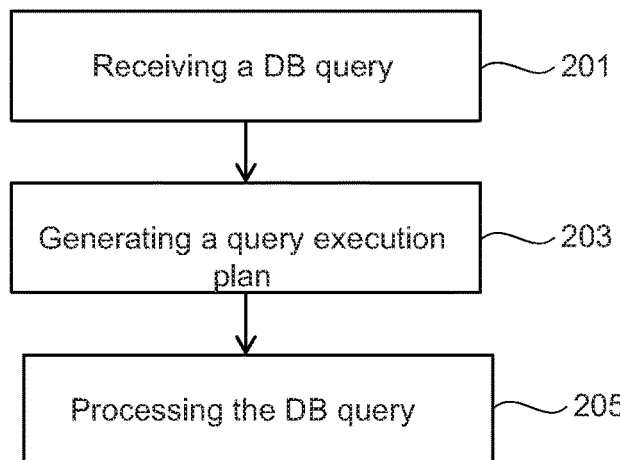
FIG. 2 is a flowchart illustrating generating statistical information for query optimization in a data processing system in accordance within an illustrative embodiment.

FIG. 2 is a flowchart illustrating generating statistical information for query optimization in data processing system 100 in accordance within an illustrative embodiment.

In step 201, the first database engine 101 may receive a database query for accessing the first dataset 112. The database query involves one or more attributes of the first dataset 112.

In step 203, the query optimizer 110 of the first database engine 101 may generate a query execution plan for the received database query on the first dataset 112 using collected statistical information. The statistical information (or statistics) is collected using at least the second dataset 132. For example, the statistical information may be collected using the second dataset and the first dataset. For that the first dataset may for example be replicated or transformed in order to be present where the statistic is generated. The collected statistical information comprises information on one or more attributes of the first dataset 112.

In one example, the statistical information may be collected using the DB application 131 of the second database engine 121. This may for example be done by sending a request for such statistical information by the first database engine 101 to the second database engine 121. In response to that request, then statistical information may be collected e.g. by the DB application 131 and may be sent to the first database engine 101. In another example, the statistical information may be collected automatically by the second database engine 121 using the DB application 131 on a periodic basis ever e.g. every day or every week or each time new data is stored in the second database engine 121. The collected statistical information may then be pushed or sent by the second database system 121 to the first database system 101 e.g. as soon as the statistical information is collected.

In another example, the second database engine 121 may provide a random sample of the second dataset 132 and may for example send the random sample to the first database engine 101. The DB application 111 may then collect the statistical information using the random sample.

In step 205, the database query may be processed in the first database engine 101 according to the query execution plan.

Figure 3:
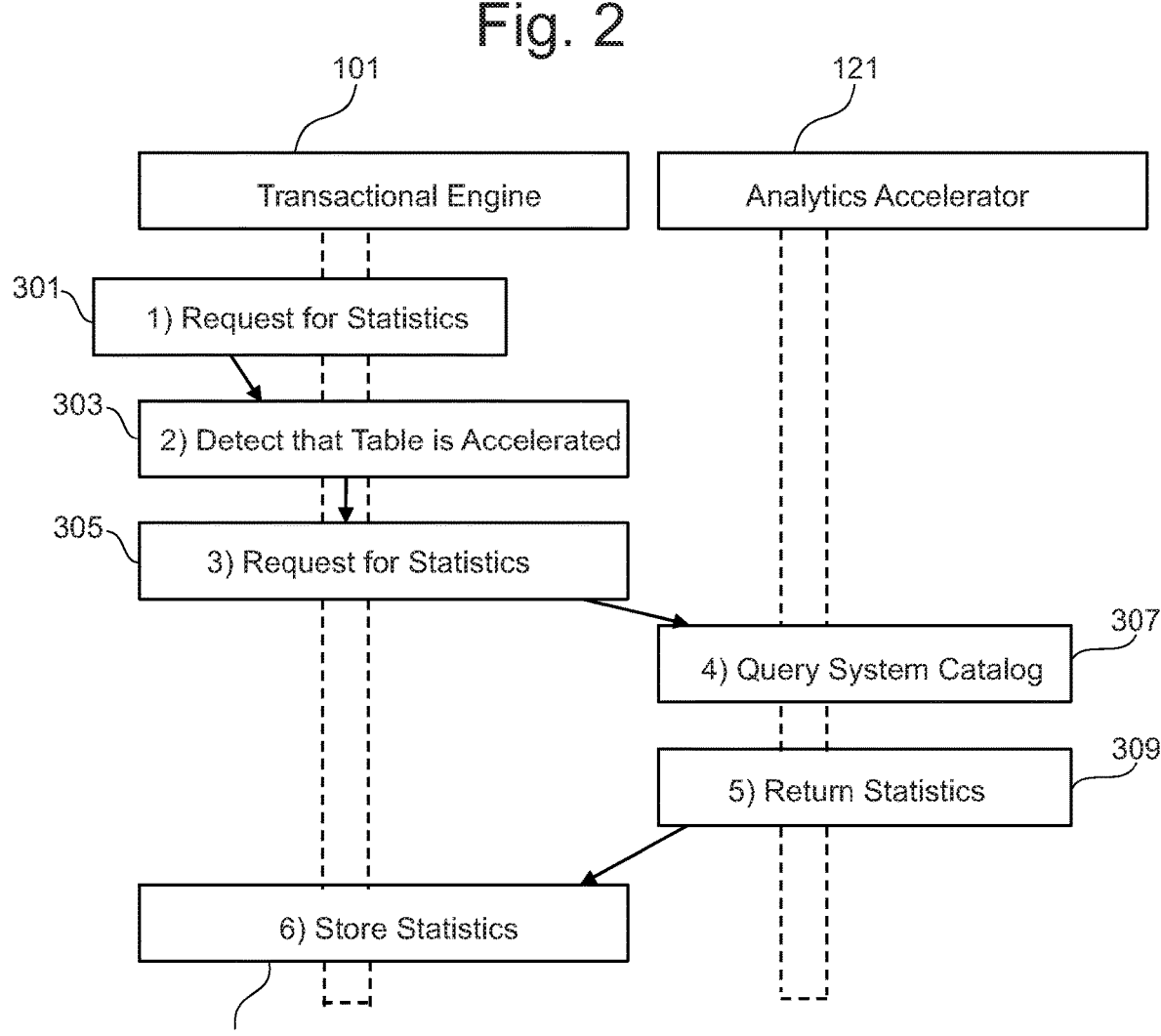
FIG. 3 is a flowchart illustrating on-demand statistics computation in hybrid DBMS for OLTP and OLAP analysis in accordance with an illustrative embodiment.

FIG. 3 is a flowchart illustrating on-demand statistics computation in hybrid DBMS for OLTP and OLAP analysis in accordance with an illustrative embodiment. In step 301, the transactional engine 101 of the hybrid DBMS may request or need statistical information of a given data table. The transactional engine 101 may realize or detect in step 303 that the data table is accelerated (e.g. being part of the accelerator after being transformed or replicated) and that the existing statistics on that accelerated table are insufficient, incomplete, or simply outdated on the transactional engine 101. This can happen due to a detection mechanism, or simply through an explicit administrator command. The transactional engine 101 then requests in step 305 the analytics accelerator 121 for a copy of its statistics on the data table in question. The analytics accelerator 121 may then query in step 307 its System Catalog for the requested statistics. If for example, the statistics are not found the analytics accelerator 121 may then generate that statistics. The analytics accelerator 121 may send the requested statistics in step 309. The transactional engine 101 may receive in step 311, the statistics store, and use it for query optimization.

This method may be advantageous as the statistics on the analytics accelerator 121 are up to date or at least more useful than those of the transactional engine 101.

Figure 4:
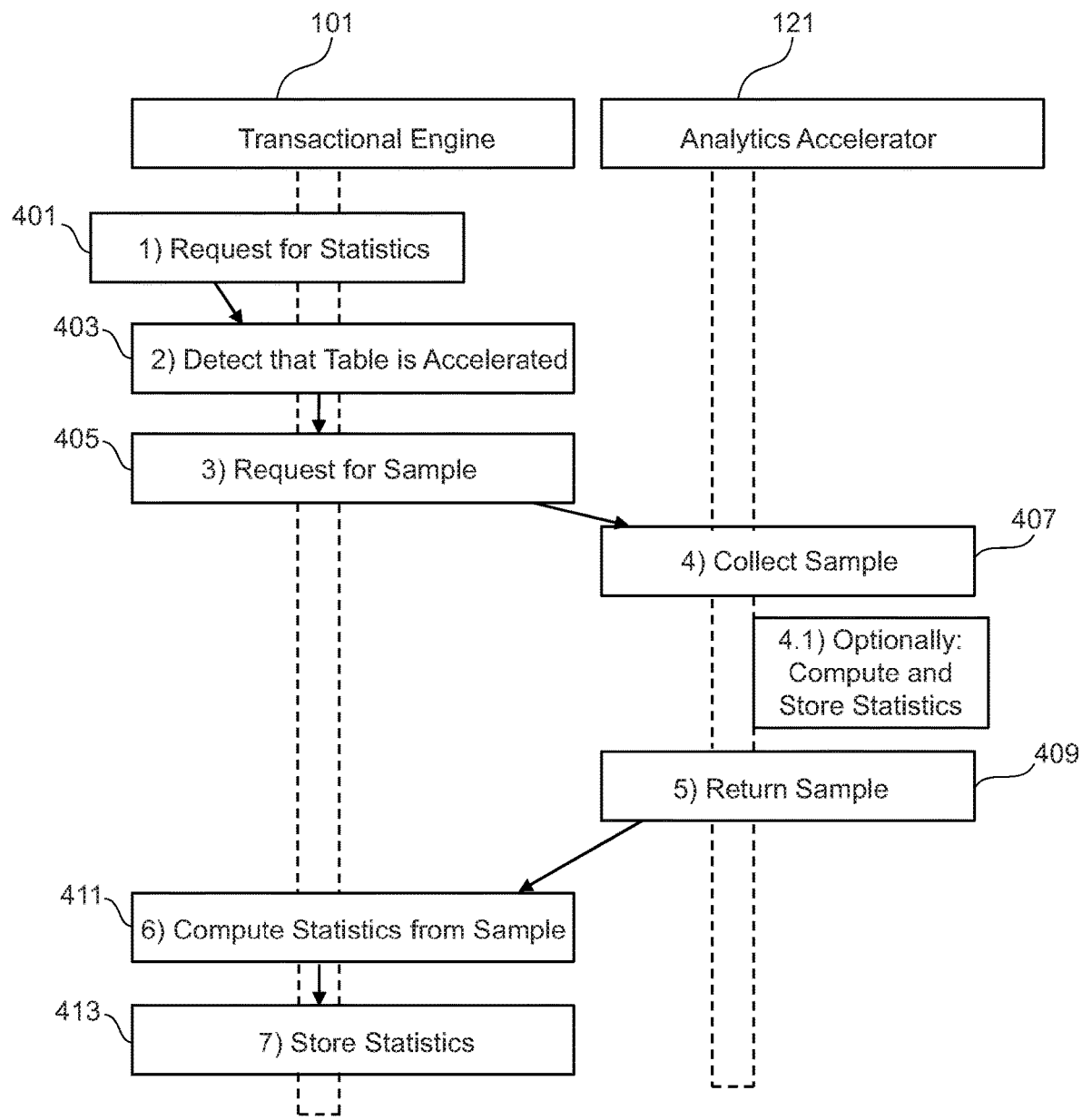
FIG. 4 is a flowchart illustrating the operation of on-demand random sampling in accordance with an illustrative embodiment.

FIG. 4 is a flowchart illustrating the operation of on-demand random sampling in accordance with an illustrative embodiment. Computing statistics may rely on heuristic algorithms that only approximate the characteristics of the data. This is because the exact computation is utterly resource-intensive and also because a sufficiently accurate estimate suffices for the purposes of query optimization. Nevertheless, heuristic algorithms do come with inaccuracies, so that the cost model of a query optimizer, which ultimately consumes the statistics, is tuned to compensate them. It is a long, cumbersome and error-prone way which every mature enterprise system (e.g. 101) has undergone until the cost model played well together with the quirks of the involved heuristics. Consequently, it may not be as straight-forward as it may seem to replicate the same algorithms to which the transactional engine is tuned in the analytics accelerator.

Consequently, another approach to collect statistics is to ask the analytics accelerator 121 for a random sample of the data, as sketched in FIG. 4.

In step 401, the transactional engine 101 of the hybrid DBMS may request or need statistical information of a given data table. The transactional engine 101 may realize or detect in step 403 that the data table is accelerated (e.g. replicated or transformed into the analytic accelerator to form part of the second dataset 132) and that the existing statistics on that accelerated table are insufficient, incomplete, or simply outdated on the transactional engine 101. This can happen due to a detection mechanism, or simply through an explicit administrator command. The transactional engine 101 then requests in step 405 the analytics accelerator 121 for a sample of data. The analytics accelerator 121 may then randomly choose in step 407 rows from anywhere in the table (e.g. of second dataset 132). The analytics accelerator 121 returns in step 409 the sample to the transactional engine 101 and the transactional engine 101 runs the required statistical algorithms on the sample in step 411. In step 413 the transactional engine 101 may store the statistics. This method may save lots of disk I/O on the transactional engine 101 and does not pollute its buffer pool with otherwise cold data. And it may allow reusing the existing algorithm implementations that have been well tested and to which the system 101 has been fine-tuned.

Push Statistics method: the transactional engine 101 called or requested the analytics accelerator 121 on demand in FIGS. 3 and 4. The opposite direction may be used as well. Thus, whenever the analytics accelerator 121 generates new statistics on a particular table, it can generate them for the transactional engine 101 as well and return them (provided the table also exists in the transactional engine). Statistics generation on the analytics accelerator 121 may for example be performed every time the data in the analytics accelerator 121 has been refreshed. This means negligible additional effort for the analytics accelerator 121, but it may greatly improve the query plans of the transactional engine 101, as the statistics are updated a lot more often than traditionally.

Moreover, the push statistics approach can be adapted to computing and shipping only a random sample, which the analytics accelerator 121 likely computes anyway for its own purposes. Pushed statistics modify the system catalog of the transactional engine 101 without explicit request. Push statistics method may be implemented in a way that it can be disabled (or must be explicitly enabled). Furthermore, push statistics method and statistics sharing as described in FIG. 3 may not be mutually exclusive. They can be combined, so that the transactional engine 101 can request fresh statistics whenever needed, but equally is able to receive them as soon as they are computed.

In another example, a method for generating statistical information for query optimization is provided. The method comprises: receiving a query against at least one table stored in a first database engine; a second database engine providing a random sample on (at least part of) the at least one table to the first database engine; the first database engine calculating statistical information on the random sample; a query optimizer of the first database engine using the statistical information to generate a query execution plan for the query and processing the query in the first database engine according to the query execution plan.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a computer readable storage medium having a computer readable program for generating statistical information for query optimization in a computing device, the computing device comprising a first database engine maintaining a current first dataset analytics accelerator maintaining a second dataset generated from previous first datasets stored therein, wherein the computer readable program, when executed on a computing device, causes the computing device to:
   receive, at the first database engine, a database query for accessing the current first dataset, the database query involving one or more attributes of the current first data set;
   obtain, by the first database engine from the analytics accelerator, statistical information on one or more attributes of the current first dataset collected from the second dataset that is generated from previous first datasets, wherein the previous first datasets are datasets that were maintained previous to the current first dataset by the first database engine;
   generate, by the first database engine, a query execution plan for the database query on the current first dataset using the statistical information collected on the second dataset; and
   process, by the first database engine, the database query on the current first dataset according to the query execution plan.

2. The computer program product of claim 1, wherein the computer readable program to collect the statistical information further causes the computing device to:
   receive by the first database engine from the analytics accelerator the statistical information.

3. The computer program product of claim 1, wherein the computer readable program to collect the statistical information further causes the computing device to:
   receive, by the first database engine, from the analytics accelerator a random sample on the second dataset; and
   calculate, by the first database engine, the statistical information based on the random sample.

4. The computer program product of claim 3, wherein the computer readable program causing the computing device to receive the random sample is performed in response to the computer readable program causing the computing device to send a request from the first database engine to the analytics accelerator.

5. The computer program product of claim 3, wherein the computer readable program causing the computing device to receive the random sample is automatically performed on a predefined periodic basis.

6. The computer program product of claim 1, wherein the current first dataset comprises records of a given table having a commit date after a predefined date and wherein the second dataset comprises records of the given table having a commit date before that predefined date.

7. The computer program product of claim 1, wherein the current first dataset comprises records of a given table having an access frequency higher than a predefined access frequency threshold and wherein the second dataset comprises records of the given table having an access frequency smaller than the predefined access frequency threshold.

8. The computer program product of claim 1, wherein the computer readable program further causes the computing device to:
   receive, by the analytics accelerator, another database query for accessing the second dataset;
   generate, by the analytics accelerator, a query execution plan for the other database query using the collected statistical information; and
   process, by the analytics accelerator, the other database query according to the query execution plan.

9. The computer program product of claim 1, wherein the statistical information comprises at least one of:
   the number of distinct values of the one or more attributes;
   the cardinality of values of the one or more attributes:
   minimum and maximum values of the one or more attributes;
   the fraction of NULL values of the one or more attributes;
   histogram of values of the one or more attributes; or
   correlation factor between values of different attributes.

10. A data processing system for generating statistical information for query optimization, the system comprising a first database engine maintaining a current first dataset and an analytics accelerator maintaining a second dataset generated from previous first datasets, the system comprising:
   a processor; and
   a memory coupled to the processor, wherein the memory comprises instructions which, when executed by the processor, cause the processor to:
   receive, at the first database engine, a database query for accessing the current first dataset, the database query involving one or more attributes of the current first data set;
   obtain, by the first database engine from the analytics accelerator, statistical information on one or more attributes of the current first dataset collected from the second dataset that is generated from previous first datasets, wherein the previous first datasets are datasets that were maintained previous to the current first dataset by the first database engine;
   generate, by the first database engine, a query execution plan for the database query on the current first dataset using the statistical information collected on the second dataset; and
   process, by the first database engine, the database query on the current first dataset according to the query execution plan.

11. The system of claim 10, wherein the instructions to collect the statistical information further cause the processor to:
receive by the first database engine from the analytics accelerator the statistical information.

12. The system of claim 10, wherein the instructions to collect the statistical information further cause the processor to:
receive, by the first database engine, from the analytics accelerator a random sample on the second dataset; and
calculate, by the first database engine, the statistical information based on the random sample.

13. The system of claim 12, wherein the instructions causing the processor to receive the random sample is performed in response to the instructions causing the processor to send a request from the first database engine to the analytics accelerator.

14. The system of claim 12, wherein the instructions causing the processor to receive the random sample is automatically performed on a predefined periodic basis.

15. The system of claim 10, wherein the current first dataset comprises records of a given table having a commit date after a predefined date and wherein the second dataset comprises records of the given table having a commit date before that predefined date.

16. The system of claim 10, wherein the current first dataset comprises records of a given table having an access frequency higher than a predefined access frequency threshold and wherein the second dataset comprises records of the given table having an access frequency smaller than the predefined access frequency threshold.

17. The system of claim 10, wherein the instructions further cause the processor to:
receive, by the analytics accelerator, another database query for accessing the second dataset;
generate, by the analytics accelerator, a query execution plan for the other database query using the collected statistical information; and
process, by the analytics accelerator, the other database query according to the query execution plan.

18. The system of claim 10, wherein the statistical information comprises at least one of:
the number of distinct values of the one or more attributes;
the cardinality of values of the one or more attributes;
minimum and maximum values of the one or more attributes;
the fraction of NULL values of the one or more attributes;
histogram of values of the one or more attributes; or
correlation factor between values of different attributes.

\* \* \* \* \*